United States Patent
Wheeler et al.

(10) Patent No.: US 8,953,306 B2
(45) Date of Patent: Feb. 10, 2015

(54) PLUG-ON NEUTRAL LOAD CENTER HAVING A ROTATING NEUTRAL RAIL RETAINED BY A TWO-PIECE DIELECTRIC BARRIER

(71) Applicant: Schneider Electric USA, Inc., Palatine, IL (US)

(72) Inventors: Kim D. Wheeler, Murfreesboro, TN (US); Jeffrey O. Sharp, Murfreesboro, TN (US); Jason D. Potratz, Raleigh, NC (US)

(73) Assignee: Schneider Electric USA, Inc., Palatine, IL (US)

( * ) Notice: Subject to any disclaimer, the term of this patent is extended or adjusted under 35 U.S.C. 154(b) by 216 days.

(21) Appl. No.: 13/720,163

(22) Filed: Dec. 19, 2012

(65) Prior Publication Data

US 2014/0168862 A1    Jun. 19, 2014

(51) Int. Cl.
*H02B 1/20* (2006.01)
*H02B 1/056* (2006.01)
*H01B 1/20* (2006.01)
*H02B 5/02* (2006.01)
*H02B 5/00* (2006.01)

(52) U.S. Cl.
CPC . *H02B 1/20* (2013.01); *H02B 1/056* (2013.01)
USPC .......... 361/640; 361/634; 361/637; 361/645; 361/652; 174/68.2; 174/71 B; 174/149 B; 174/166 S; 200/293; 200/295

(58) Field of Classification Search
USPC ......... 361/600, 601, 605, 622, 624, 627, 632, 361/633, 634, 636, 637, 640, 641, 644, 645, 361/648, 652, 656, 658; 174/52.1, 67, 68.2, 174/71 B, 70 B, 99 B, 72 B, 65 R, 149 B, 174/166 R, 166 S; 248/223.31, 224.51, 248/225.11, 222.12, 220.21; 24/17 AP, 107, 24/16 PB; 200/293, 295
See application file for complete search history.

(56) References Cited

U.S. PATENT DOCUMENTS

| | | | |
|---|---|---|---|
| 2,914,708 A | 11/1959 | Harold | |
| 3,218,519 A | 11/1965 | Casey | |
| 3,278,807 A | * 10/1966 | Galante et al. | 361/637 |
| 3,339,119 A | 8/1967 | Stanback et al. | |
| 3,349,292 A | 10/1967 | Meacham | |

(Continued)

OTHER PUBLICATIONS

Eaton Product Brochure, Plug into Savings with the CH Plug-on Neutral Loadcenter and AFCI and GFCI Breakers (2006); 4 pages.

*Primary Examiner* — Michail V Datskovskiy
(74) *Attorney, Agent, or Firm* — Locke Lord LLP

(57) ABSTRACT

A load center featuring a two-piece dielectric barrier that securely retains a plug-on neutral rail and methods of assembling the same. The barrier includes a shield and a base having a protrusion that cooperates with fingers of the shield to securely retain the conductor in the load center. The shield is installed over the base and rests on hooks protruding from the base. This creates a distance between the protrusion and the fingers to allow the conductor to be inserted through a gap between the fingers along the conductor's skinny edge. The conductor rotates 90 degrees until it rests on the protrusion. The base and shield are snapped together, causing the hooks of the base to attach to the shield. At the same time, the fingers of the base move downward to rest against the conductor so that it is sandwiched securely between the protrusion and the fingers.

24 Claims, 12 Drawing Sheets

(56) References Cited

U.S. PATENT DOCUMENTS

| | | | |
|---|---|---|---|
| 4,079,439 A | 3/1978 | Coles et al. | |
| 4,118,754 A * | 10/1978 | Duggan | 361/637 |
| 4,142,225 A | 2/1979 | Diersing et al. | |
| 4,167,769 A | 9/1979 | Luke et al. | |
| 4,251,851 A | 2/1981 | Diersing et al. | |
| 4,449,296 A * | 5/1984 | Luke et al. | 29/883 |
| 4,636,915 A * | 1/1987 | Perkins et al. | 361/637 |
| 4,667,269 A | 5/1987 | Morby et al. | |
| 4,916,574 A * | 4/1990 | Hancock et al. | 361/649 |
| 4,931,898 A * | 6/1990 | Cole | 361/648 |
| 5,134,543 A | 7/1992 | Sharp et al. | |
| 5,179,491 A | 1/1993 | Runyan | |
| 5,245,302 A | 9/1993 | Brune et al. | |
| 5,250,918 A | 10/1993 | Edds et al. | |
| 5,272,592 A * | 12/1993 | Harris et al. | 361/637 |
| 5,302,787 A | 4/1994 | Edds et al. | |
| 5,337,211 A * | 8/1994 | Reiner et al. | 361/637 |
| 5,343,356 A * | 8/1994 | Hancock | 361/637 |
| 5,450,282 A | 9/1995 | Webber et al. | |
| 5,519,175 A * | 5/1996 | Cole | 174/149 B |
| 5,847,921 A * | 12/1998 | Kim | 361/634 |
| 6,266,232 B1 | 7/2001 | Rose et al. | |
| 6,459,570 B1 * | 10/2002 | Buchanan | 361/648 |
| 7,245,480 B2 * | 7/2007 | Dixon et al. | 361/634 |
| 7,417,849 B2 * | 8/2008 | Dixon et al. | 361/634 |
| 7,449,645 B1 | 11/2008 | Flegel | |
| 7,508,653 B2 | 3/2009 | Parlee | |
| 7,772,723 B1 | 8/2010 | Flegel | |
| 7,957,122 B2 * | 6/2011 | Sharp | 361/673 |
| 2008/0003850 A1 | 1/2008 | Seff et al. | |
| 2008/0158787 A1 | 7/2008 | Parlee | |

\* cited by examiner

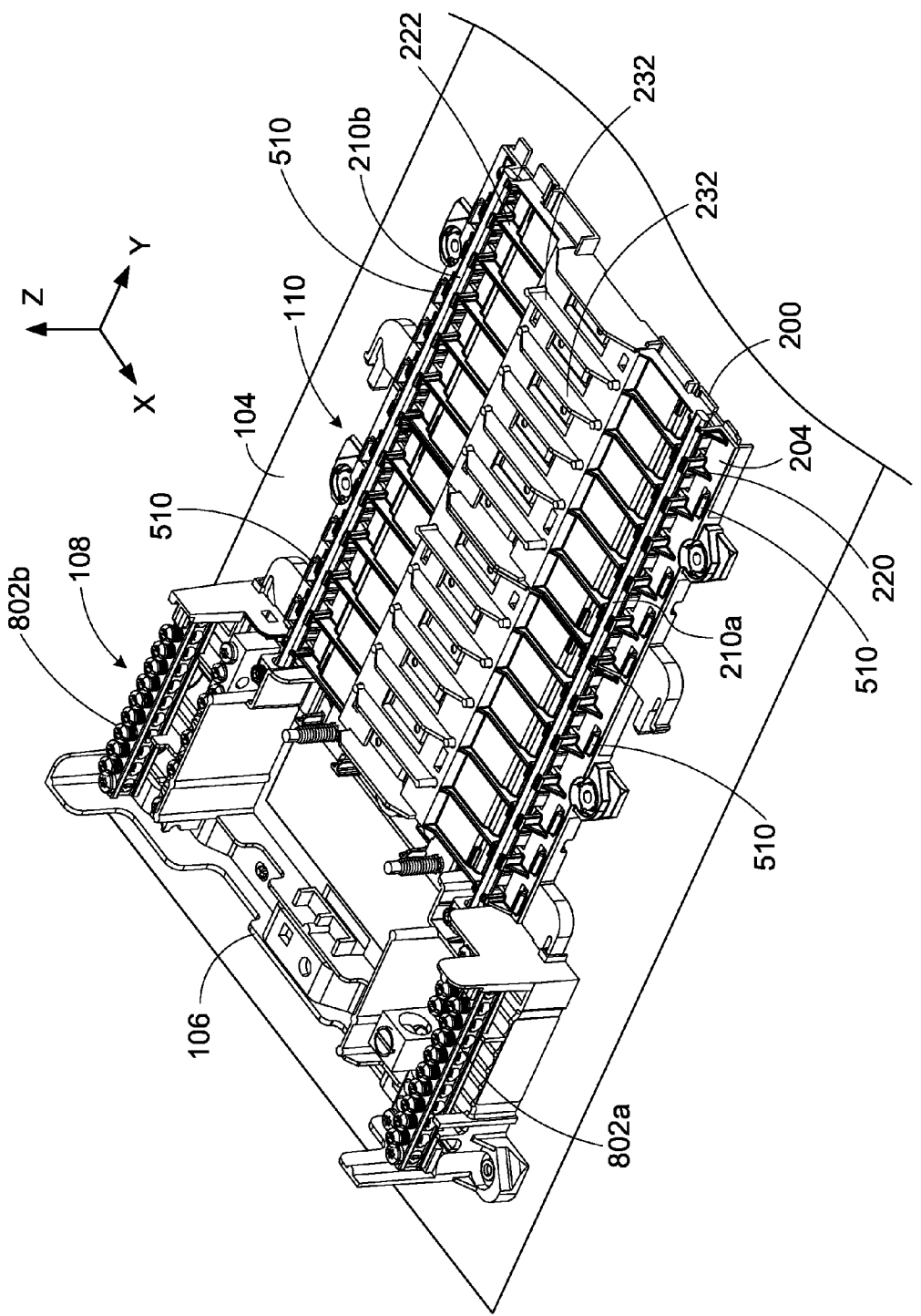

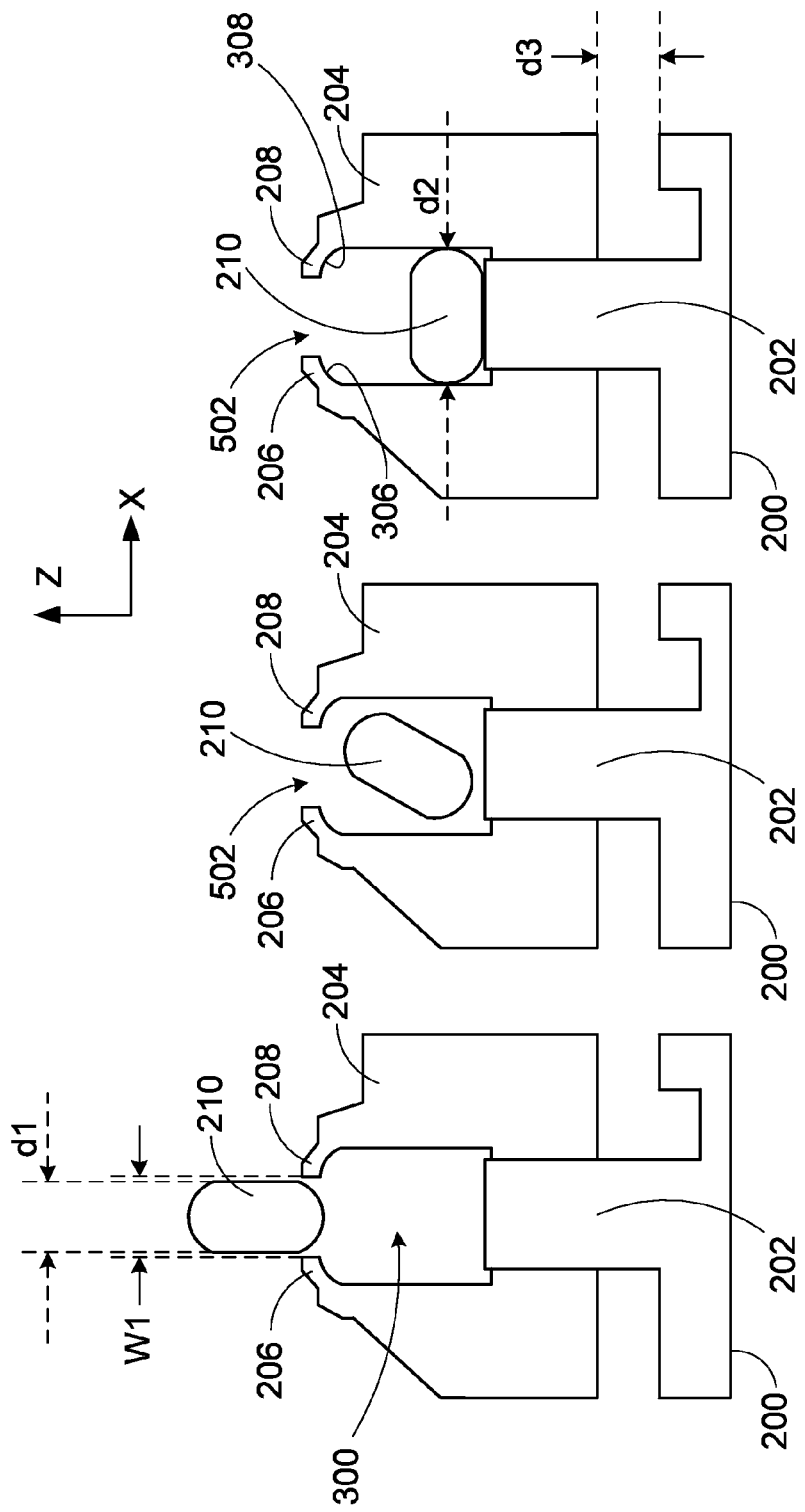

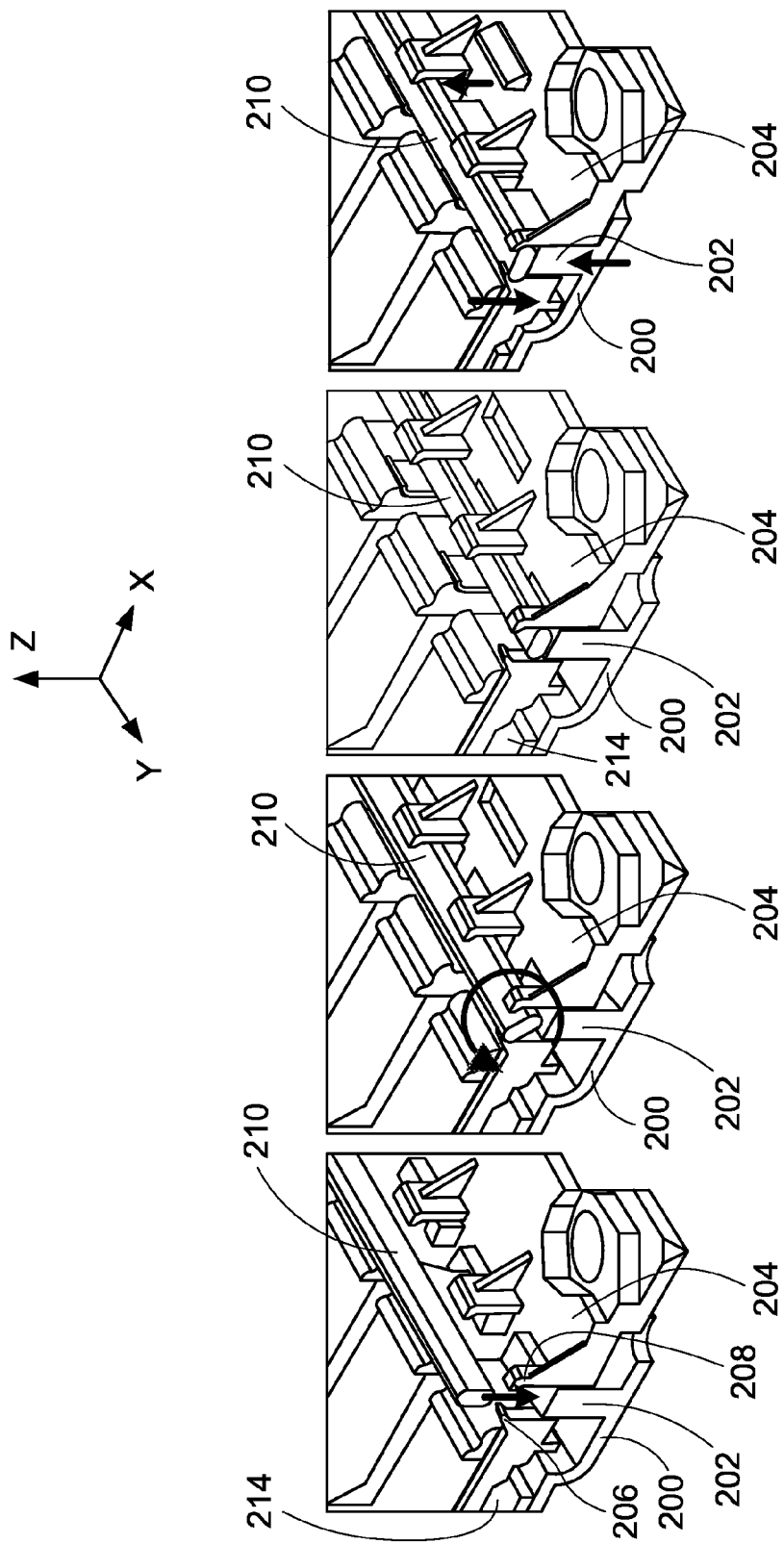

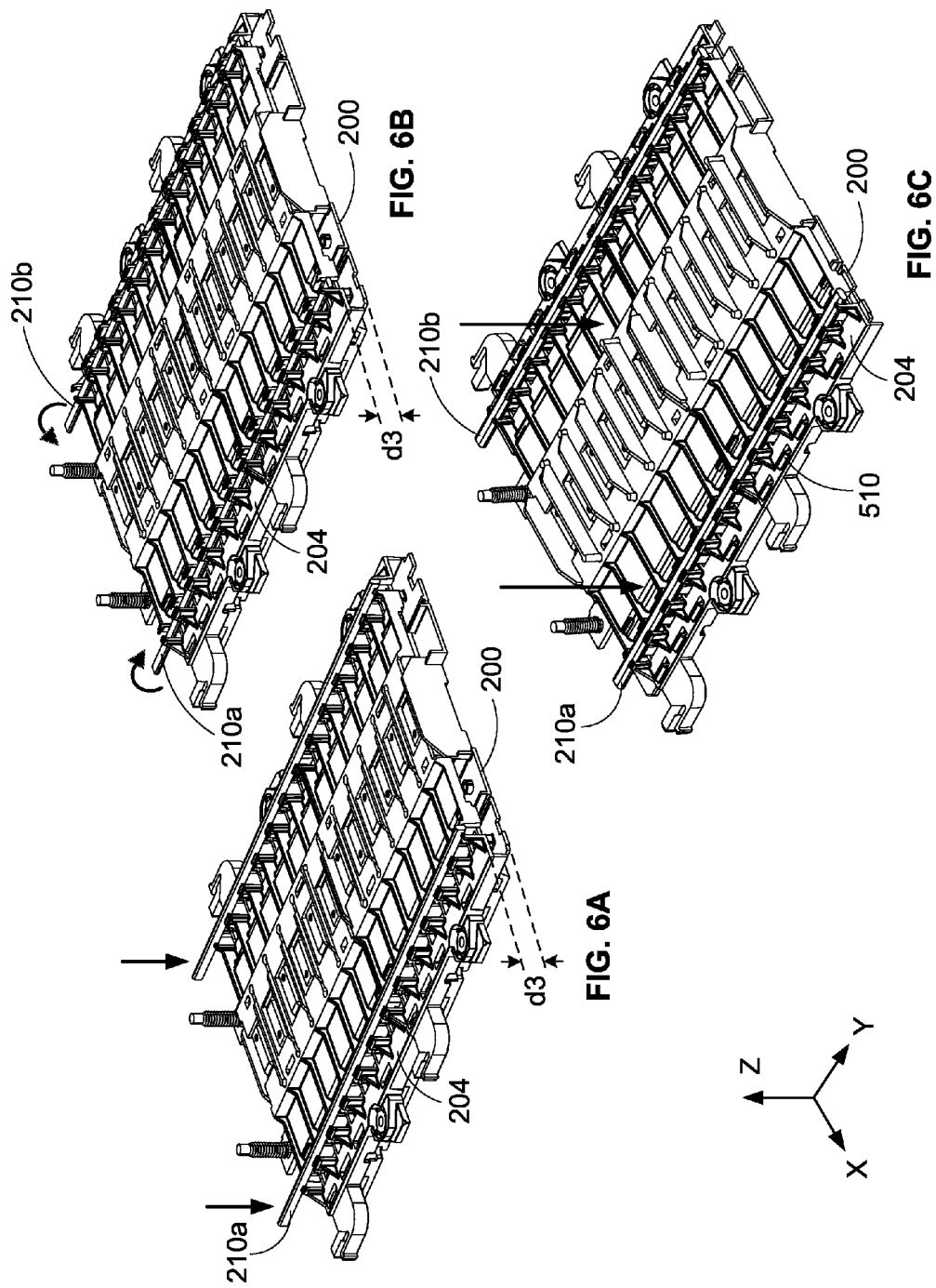

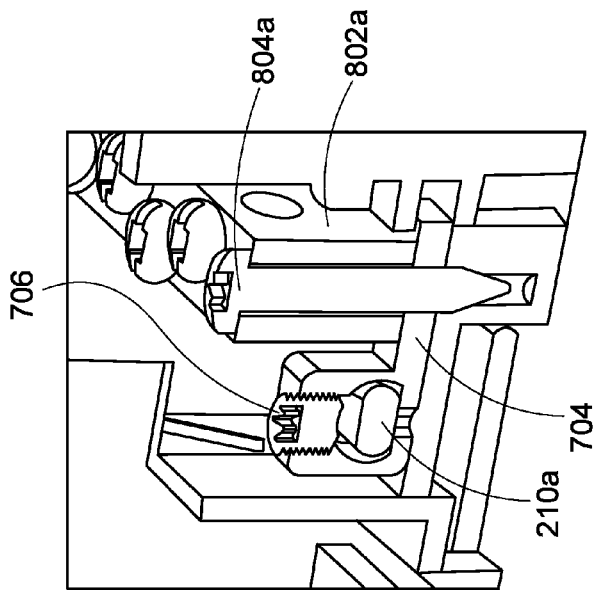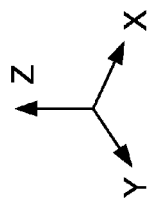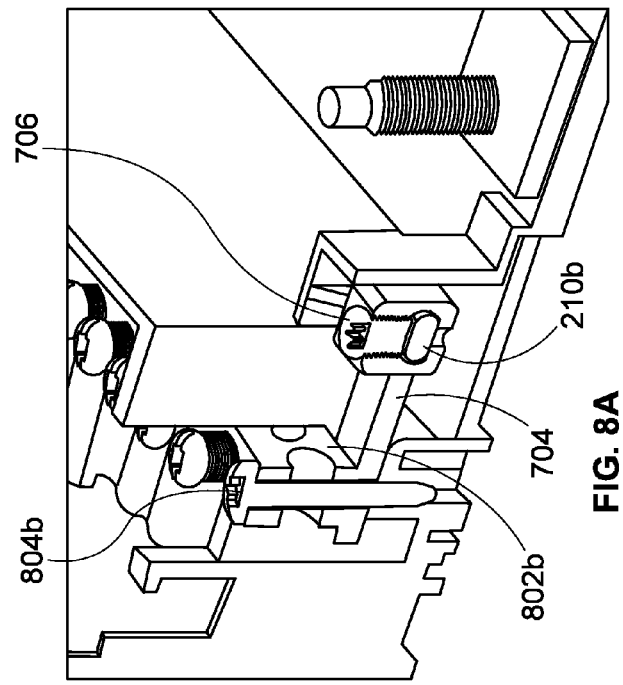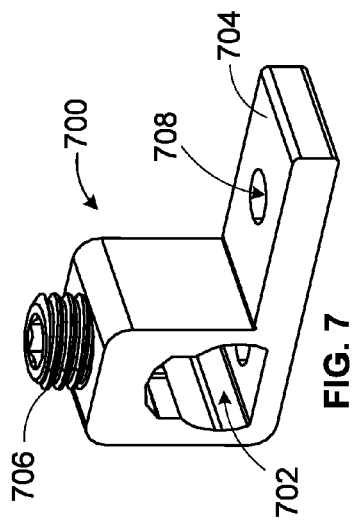

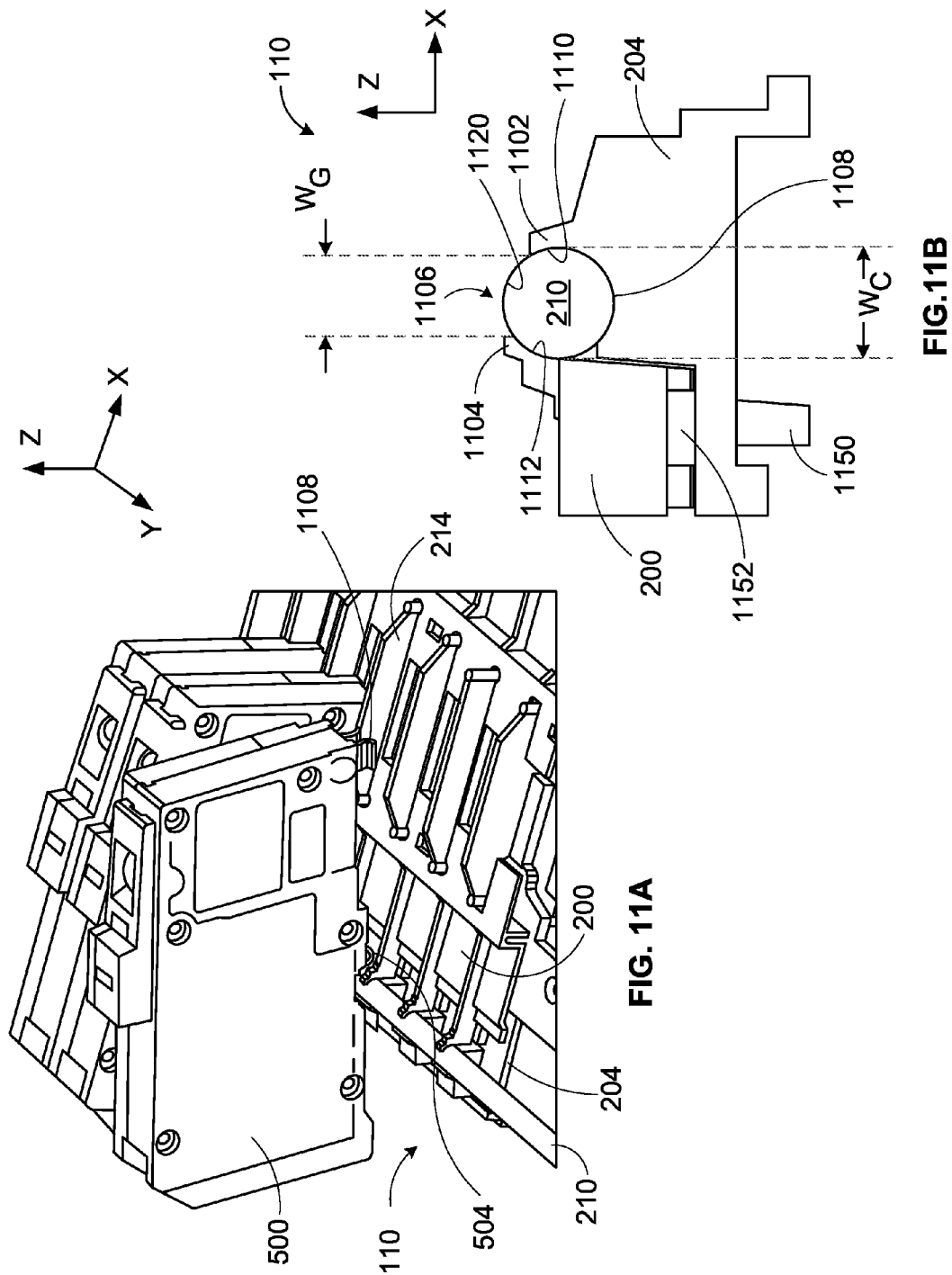

PLUG-ON NEUTRAL LOAD CENTER HAVING A ROTATING NEUTRAL RAIL RETAINED BY A TWO-PIECE DIELECTRIC BARRIER

FIELD OF THE INVENTION

The present disclosure relates to electrical distribution equipment and methods of assembling the same, and in particular, to a plug-on neutral load center featuring a neutral rail that is installed in a Z-axis direction and methods of assembling the same.

BACKGROUND

A load center is housed within a metal enclosure or panel and holds multiple circuit breakers that are connected to various branch circuits in an electrical distribution system. Some load centers feature a plug-on neutral rail or conductor to which neutral connectors or jaws of the circuit breakers plug onto. These plug-on type circuit breakers have the convenience of being able to plug directly onto the neutral rail without using any fasteners or wiring to connect the circuit breaker to the neutral busbar in the load center. Assembling the dielectric and conductive pieces of the load center before installing it into the enclosure is a time-consuming, labor-intensive process. A need exists for reducing and simplifying the assembly of the load center using fewer components and fewer steps.

BRIEF SUMMARY

Aspects of the present disclosure can be referred to as featuring "snap-in" plug-on neutral rails in which the neutral rail snaps (e.g., by a snap fit connection) into retention features formed in the dielectric barrier that separates the energized phase conductors from the grounded metal enclosure into which the plug-on load center is installed, without any fasteners attaching the neutral rail to the dielectric barrier.

A load-center has a two-piece, dielectric, insulating and retaining barrier between a plug-on neutral rail and line or phase conductors for connecting electronic circuit breakers with plug-on neutral connectors to the load center. The barrier has a base and a shield member, which have corresponding features that mutually cooperate to securely retain the neutral rail within the load center. The neutral rail has a "rolling pill-shaped" rounded rectangular cross section with a skinny (narrow) and fatter (wide) dimension. The shield member has retention features that resemble fingers arched toward one another to form an air gap between which the neutral rail is inserted lengthwise along its skinny dimension. For its part, the base contributes a protrusion feature that protrudes away from the base, and when the neutral rail is dropped between the gap, it automatically rotates, thanks to its rounded "rolling pill" edges, by 90 degrees until it rests on the protrusion of the base along its fatter dimension and against inner surfaces of the finger-like retaining features.

The shield member and the base are snapped or otherwise secured together, causing the protrusion of the base to push the neutral rail into secure engagement against inner or lower surfaces of the retention features of the shield member. This engagement is strong enough to keep the neutral rail from separating from the shield member as plug-on neutral connectors of circuit breakers are installed onto and removed from the neutral rail.

A method of assembling a load center, such as the one just described, is also disclosed. The assembly involves a top-down assembly, in which components of the load center are assembled in a single direction without requiring any repositioning or reorientation of the load center as the above-described components are installed. First, the base is laid down and the shield member is installed over the top of the base. The base can optionally include shield retaining features, for example, in the form of hooks, that eventually hook into corresponding grooves or apertures in the shield member. The bottom of the shield member can rest on top of these hooks, creating enough distance between the protrusion(s) of the base and the retaining fingers of the shield to allow space for the neutral rail to clear the retention features when inserted lengthwise through the gap along its skinny dimension. It should be emphasized that the protrusion can be part of the shield instead of the base.

Once the neutral rail rotates by 90 degrees so that it rests on the protrusion of the base along a surface defining the fatter dimension, the shield member is pressed down against the base, causing the snap fit clips 510 of the base to engage the grooves or apertures in the shield member 204. At the same time, the space between the protrusion 202 of the base and the retention features (fingers) of the shield member closes in until the top of the neutral rail abuts against the retention features of the shield member and the bottom of the neutral rail rests on the protrusion of the base. No fasteners of any kind are required to assemble the base, shield member, and neutral rail together, though use of fasteners is not precluded either. Moreover, these components of the load center are installed along the same axis (e.g., from the top of the load center toward the rear wall of the metal enclosure into which the load center is eventually installed) without requiring any fasteners or repositioning of the load-center components as they are installed. The assembled load center can then be installed onto a rear wall of an enclosure and is accessible from a conventional door or access panel of the enclosure. A neutral connector is used to connect the neutral rail to the neutral busbar of the load center, which is eventually connected by wires to neutral wiring outside the enclosure.

A further aspect includes a shield member having a pair of fingers that are arched toward one another to create an air gap that is smaller than a width of the neutral rail. The neutral rail is pushed downward through the gap to cause the fingers to separate slightly until the neutral rail snaps into place beneath the fingers, whereupon they snap back to their unstressed position, thereby creating a snap fit connection between the shield member and the neutral rail without the need for any fasteners.

In another aspect, the neutral rail has a cross section in which flat notches are formed on either side of the neutral rail. The shield member has two arched fingers with hook ends that grab onto the flat notches when the neutral rail is inserted between a gap spanning across the arched fingers. The hook ends hold the flat notches of the neutral rail in a snap fit engagement without the need for any fasteners. The fingers are spread apart slightly as the neutral rail is inserted along a Z-axis (orthogonal to the rear wall of the enclosure) through the gap before returning to an unstressed position.

In yet another aspect, the base and the shield member cooperate to secure the neutral rail in position in the load center. The base includes a retention member and the shield member includes a corresponding retention member. The base is laid down first along the Z-axis, then the neutral rail is installed into the retention member of the base also along the Z-axis, and finally the shield member is installed along the Z-axis over the base to securely engage the neutral rail between the retention members of the base and the shield member. Again, no fasteners are necessary.

Not every aspect of the inventive concepts disclosed herein has been included in this summary. This summary represents one of many ways of implementing an exemplary aspect of the present disclosure. This and other implementations are described in more detail in the description that follows.

The foregoing and additional aspects and embodiments of the present disclosure will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the present disclosure will become apparent upon reading the following detailed description and upon reference to the drawings.

FIG. 2A is a top perspective view of the load center showing two neutral rails installed and securely retained between a dielectric shield member and a dielectric base according to an aspect of the present disclosure;

FIG. 3A is a cross-sectional view of part of the shield member and the base with the neutral rail being dropped between a gap formed by retention features of the shield member;

FIG. 3B illustrates the neutral rail shown in FIG. 3A being rotated by 90 degrees to a resting position shown in FIG. 3C;

FIG. 3C illustrates the neutral rail shown in FIG. 3B fully rotated by 90 degrees to a resting position on top of a protrusion of the base before snapping the base and the shield member together;

FIG. 4A is a perspective view of the neutral rail being dropped into gaps between retention features of the shield member;

FIG. 4B illustrates the neutral rail of FIG. 4A being rotated into a resting position on top of a protrusion of the base;

FIG. 4C illustrates the neutral rail of FIG. 4B in a resting position and rotated by 90 degrees relative to its position when it was dropped in between the gaps shown in FIG. 4A;

FIG. 4D illustrates the neutral rail of FIG. 4C secured between the shield member and the base by forcing the two together to cause the protrusion to close the gap between the neutral rail and the retention features of the shield member;

FIG. 6A is a perspective view of a plug-on section of the load center featuring two neutral rails being dropped between corresponding gaps between retention features of shield members on left and right sides of the load center;

FIG. 6B illustrates the neutral rails shown in FIG. 6A being rotated 90 degrees to rest on their wide dimensions on respective protrusions in the base on either side of the load center;

FIG. 6C illustrates the neutral rails shown in FIG. 6B in their installed, retained position relative to the shield member and the base;

FIG. 7 is a perspective illustration of an example neutral connector according to an aspect of the present disclosure that can be used to connect the neutral rail to the neutral busbar of the load center;

FIG. 8A is a cut-away isometric view of the top, left side of the load center showing the neutral connector of FIG. 7 connecting the neutral rail to the neutral busbar on the left side of the load center;

FIG. 8B is a cut-away isometric view of the top, right side of the load center showing another neutral connector like the one shown in FIG. 7 connecting the neutral rail to the neutral busbar on the right side of the load center;

FIGS. 11A and 11B are perspective and cross-sectional views of a snap-in configuration of a plug-on section of a load center in which the neutral rail is securely retained between corresponding retention features of a base and a shield member according to a further aspect of the present disclosure.

Figure 1:
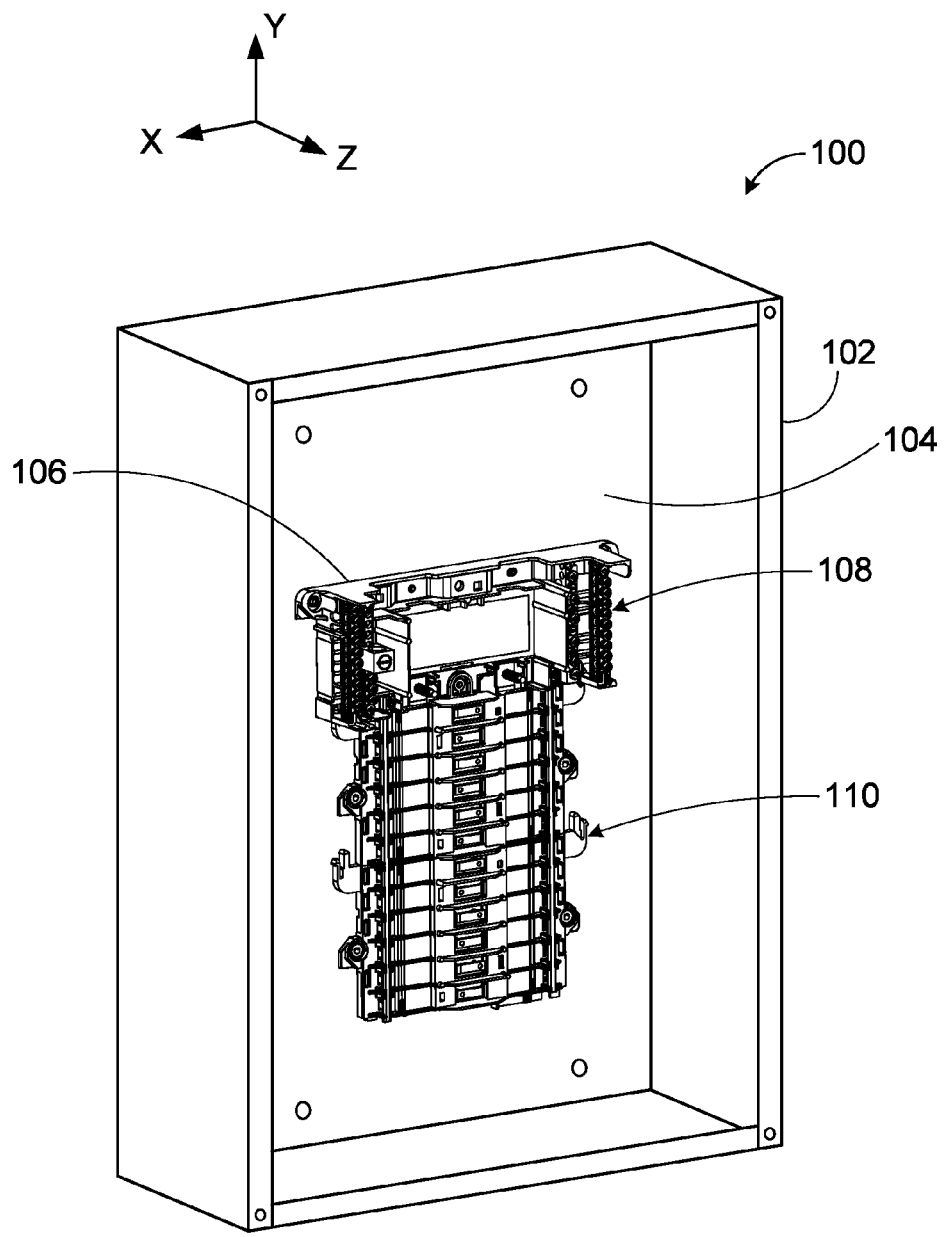
FIG. 1 is a perspective view of an enclosure housing a load center with the door or access panel removed.

While aspects of the present disclosure are susceptible to various modifications and alternative forms, specific embodiments or implementations have been shown by way of example in the drawings and will be described in detail herein. It should be understood, however, that this disclosure is not intended to be limited to the particular forms disclosed. Rather, this disclosure is to cover all modifications, equivalents, and alternatives falling within the spirit and scope of the invention as defined by the appended claims.

DETAILED DESCRIPTION

Referring to FIG. 1, a perspective view of an enclosure 102 of an electrical distribution apparatus 100, such as a panelboard or load center 106, is shown with the door or cover removed so that the lug and mounting connections of the load center 106 to plug-on neutral type circuit breakers can be seen. The load center 106 includes a main section 108 and a plug-on section 110. In general, like reference numbers refer to like structures throughout the figures and various embodiments, and a reference number starts with the number of the figure where the reference number is first introduced. The enclosure 102 is metal and has a rear wall 104 opposite the panel or door (not shown) to which the main section 108 and the plug-on section 110 is mounted.

The focus of this disclosure is on the plug-on section 110, which features a neutral rail 210 (FIG. 2A) as described in more detail below. The neutral rail 210 is made of an electrically conducting material such as aluminum or copper. Circuit breakers, of which there can be, for example, 24 or 30 or 60 per enclosure 102, such as a circuit breaker 500 (FIG. 5A), featuring a plug-on neutral connector 504 (FIG. 5A) can be mounted to the neutral rail 210 in the plug-on section 110 by plugging the connector 504 onto the neutral rail 210 without requiring any other fasteners to secure the neutral connection of the circuit breaker 500 to the load center 106. The neutral connector 504 of the circuit breaker 500 connects the circuit breaker 500 to neutral current distributed by the electrical distribution apparatus 100. The circuit breaker 500 also has a conventional line or phase connector or jaw (not shown), which connects to a line or phase current also distributed by the electrical distribution apparatus 100, which is connected between a source (e.g., one or more phases) of electrical current and one or more loads in one or more electrical circuits protected by the circuit breakers 500 installed in the electrical distribution apparatus 100. An example of a suitable circuit breaker 500 is any electronic neutral plug-on type circuit breaker from the SQUARE D® brand QO® or HOM® line of circuit breakers available from Schneider Electric. Of course, any other circuit breaker having a plug-on neutral connector can be used as the circuit breaker 500, and can be from the same or different manufacturers as other circuit breakers installed on the load center 106.

Figure 5A:
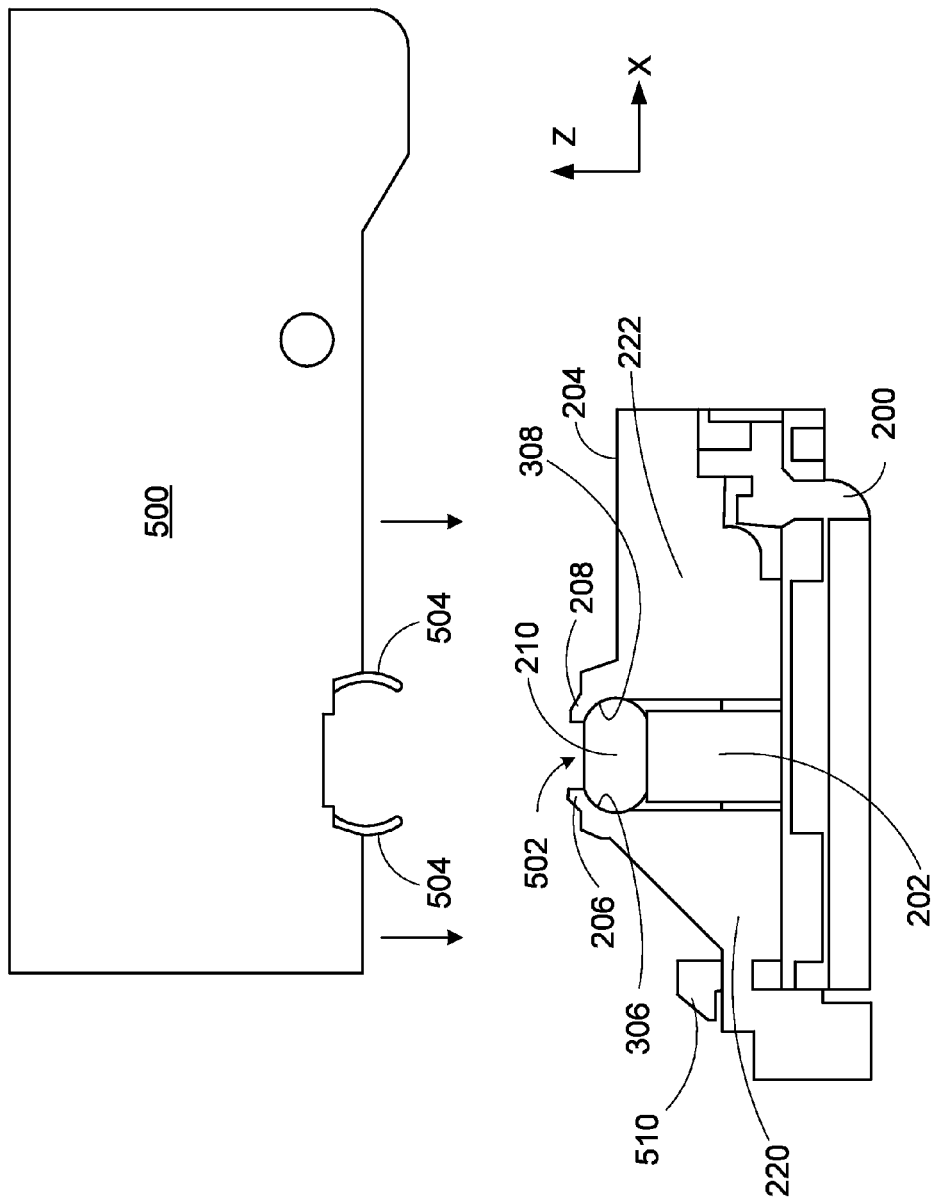
FIG. 5A is a cross-sectional view of the neutral rail in an installed position relative to the shield member and the base with a circuit breaker and a neutral connector or jaw positioned to be plugged onto the neutral rail.

The plug-on section 110 of the load center 106 includes a fixed dielectric base 200 having a major surface that defines an X-Y (Cartesian coordinates) plane as shown in FIG. 2A. The Z-axis is orthogonal to the X-Y plane. The base 200 (FIG. 5A) is fixed relative to the rear wall 104 of the enclosure 102, and includes a protrusion 202 that extends away from the X-Y plane along the Z-axis, as can be seen in FIG. 5A. The plug-on section 110 also includes a dielectric shield member 204 (FIG. 5A) that is separate from the fixed dielectric base 200. The dielectric shield member 204 and the base 200 together form a two-piece dielectric (insulating) barrier between the neutral rail 210 and phase conductors 214 (shown in FIG. 4A) carrying line or phase current to the load center 106. The phase conductors 214 are connected to stabs 232, shown in FIG. 2A, to which a corresponding line jaw (not shown) of the circuit breaker 500 are connected. The dielectric shield member 204 has opposing retention features 206, 208 (best seen in FIG. 5A) positioned when installed against the base 200 a distance from the X-Y plane along the Z-axis and from the protrusion 202. A retention "feature" is a structural feature that retains another structure in a fixed position or in a secure engagement relative to one another. The opposing retention features 206, 208 resemble finger members that form an air gap 502 (FIG. 5A) therebetween. This gap 502 has a width W1 (FIG. 3A). The plug-on neutral rail 210 has an elongate (lengthwise) shape, such as a rail, having a cross section whose first dimension d1 (FIG. 3A), such as a height, is smaller than a second dimension d2, such as a width, (FIG. 3C) which is orthogonal to the first dimension d1. The width W1 of the gap 502 between the retention features 206, 208 is larger than the first dimension d1 but smaller than the second dimension d2, such that d1<W1<d2. As a result, as explained below, the rail 210 must be inserted lengthwise (e.g., the longest dimension of the rail 210 lying along the Y-axis) through the gap 502 along the "skinny" or narrow dimension of the rail 210 defined by the distance d1. The gap 502 is dimensioned such that the rail 210 cannot be inserted through the gap 502 along the "fatter" dimension of the rail 210 defined by the distance d2. For example, the distance d2 can be 0.25 inches so that the rail 210 is compatible with existing plug-on neutral connectors or breaker mounting clips that mechanically attach to the rail 210, such as the connectors 504. For example, the rail 210 can have a length of 9.5 inches to accommodate up to 12 neutral plug-on type circuit breakers or 23 inches to accommodate up to 30 neutral plug-on type circuit breakers.

The base 200 also operates to maintain a through-air gap spacing, such as 0.5 inches, between the neutral rail 210 and the grounded rear wall 104 of the enclosure 102. This ensures that the neutral connectors 504 of the circuit breakers 500 installed on the neutral rail 210 when energized do not produce an arc or ground fault relative to the grounded rear wall 104. The shield member 204 operates to maintain a dielectric separation between the phase conductors 214 (FIG. 4A) and the neutral rail 210. The phase conductors 214 are sandwiched between the base 200 and the shield member 204, creating a dielectric separation relative to both the grounded enclosure 100 and the energized phase conductors 214 and neutral rails 210a,b.

As explained in more detail below, in short, the neutral rail 210 is inserted lengthwise along its skinny or narrow dimension (d1) through the gap 502. The cross section of the neutral rail 210 can be generally oblong or oval or rounded rectangular, i.e., rectangular with rounded corners, and can be generally or substantially constant (unvarying) across the entire length of the neutral rail 210, rendering it simple to extrude during fabrication of the rail 210. By "generally" or "substantially" constant or unvarying, it is contemplated that notches or apertures or small protrusions can be present along the length of the neutral rail 210 or that the rail 210 can be tapered to a smaller cross section at both ends, but its cross section remains the same along a substantial majority of the length of the rail 210. The neutral rail 210 can have small notches, apertures, or protrusions along the length of the rail 210 without departing from the scope of the present disclosure.

Figure 2B:
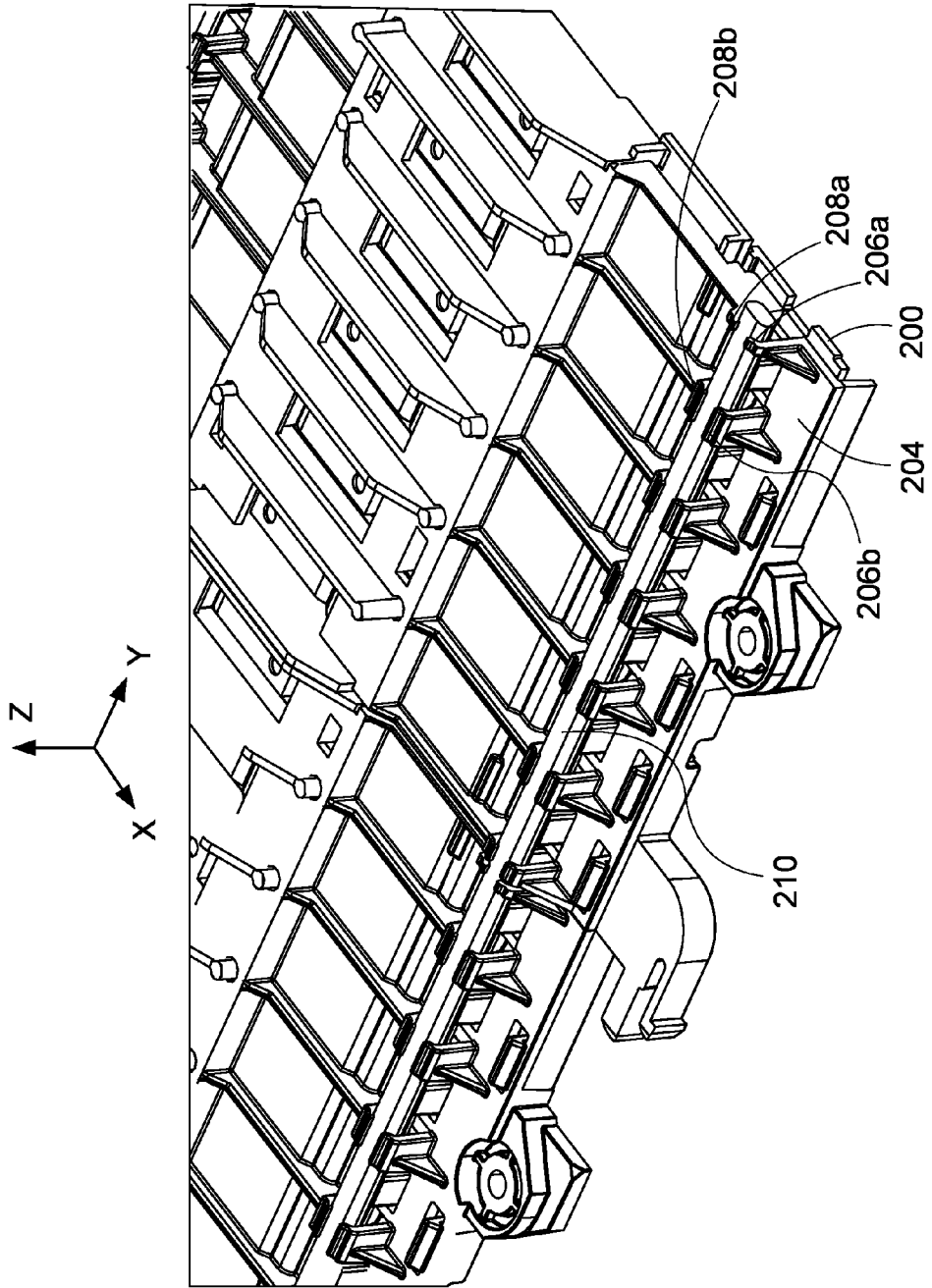
FIG. 2B is a top perspective view of an enlarged portion of the load center shown in FIG. 2A.

If the neutral rail 210 features tapered or non-square corners or edges extending along the conductor's length (Y-axis), such rounded corners or edges allow the rail 210 to automatically rotate by 90 degrees, as shown in FIG. 3B, once the rail 210 is inserted in lengthwise fashion through the gap 502 along the Z-axis and enters a retaining area 300 (FIG. 3A) between the protrusion 202 and the retention features 206, 208 and then falls by gravity onto the protrusion 202 where it rests along the length of its fatter dimension (d2). In a load center 106 that accepts many circuit breakers, such as 24 or 30 or 60 (either 12 or 15 or 30 per side) circuit breakers, there will be a corresponding number of protrusions 202 and retention features 206, 208 disposed along the length (Y-dimension) of the plug-on section 110 of the load center 106 as shown in FIGS. 2A-2B. Only one set of retention features 206, 208 and protrusions 202 is described, as the other retention features and protrusions are identical. In this pre-installed position, the height of the retaining area 300 (FIG. 3A) is dimensioned to be slightly greater than the width d2 of the rail 210. The shield member 204 is raised (along the Z-axis) relative to the base 200 to create the retaining area 300. Once the neutral rail 210 rotates by 90 degrees, as shown in FIG. 3C, the shield member 204 is forced (along the Z-axis) toward the base 200, which causes the protrusion 202 to enter the retaining area 300, forcing the rail 210 up against the retention features 206, 208 until the distance between the protrusion 202 and the ends of retention features 206, 208 forming the gap 502 becomes smaller than the distance d2. This distance approximately corresponds to the distance d1, snugly nestling the rail 210 against the retention features 206, 208 and securing it to the shield member 204 on the base 200 (see FIG. 5A) within the retaining area 300. The retention features 206, 208 hold the rail 210 in place while the neutral plug-on connectors 502 of one or more circuit breakers, such as the circuit breaker 500, are connected to and disconnected from the rail 210. No fasteners are required for this assembly, though they are not precluded either.

The "rolling pill" shape of the neutral rail 210 in the examples shown has several advantages. It uses less metal (e.g., aluminum or copper) versus a rod-shaped conductor having the same diameter as the distance d2 of the rail 210. As mentioned above, its tapered edges allow the rail 210 to automatically rotate by 90 degrees when dropped through the gap 502. It is also relatively easy to extrude during manufacturing.

As mentioned above, each of the retention features 206, 208 can resemble a finger member. Referring to FIG. 3C, each of the finger members 206, 208 has a corresponding inner surface 306, 308. The shape of the inner surfaces 306, 308 conforms to an edge portion (running lengthwise along the Y-axis) of the neutral rail 210 so that when the neutral rail 210 is urged by the protrusion 202 against the inner surfaces 306, 308, they are securely retained in space between the protrusion 202 and the inner surfaces 306, 308 of the finger members 206, 208, as can be seen in FIG. 5A. In the installed position shown in FIGS. 5A and 5B, the neutral rail 210 is secured between the shield member 204 and the base 200. The protrusion 202 can extend along substantially the entirety of the length (along the Y-axis) of the shield member 204, or individual protrusions 202 can be spaced to correspond to each set of retention features 206, 208.

Figure 5B:
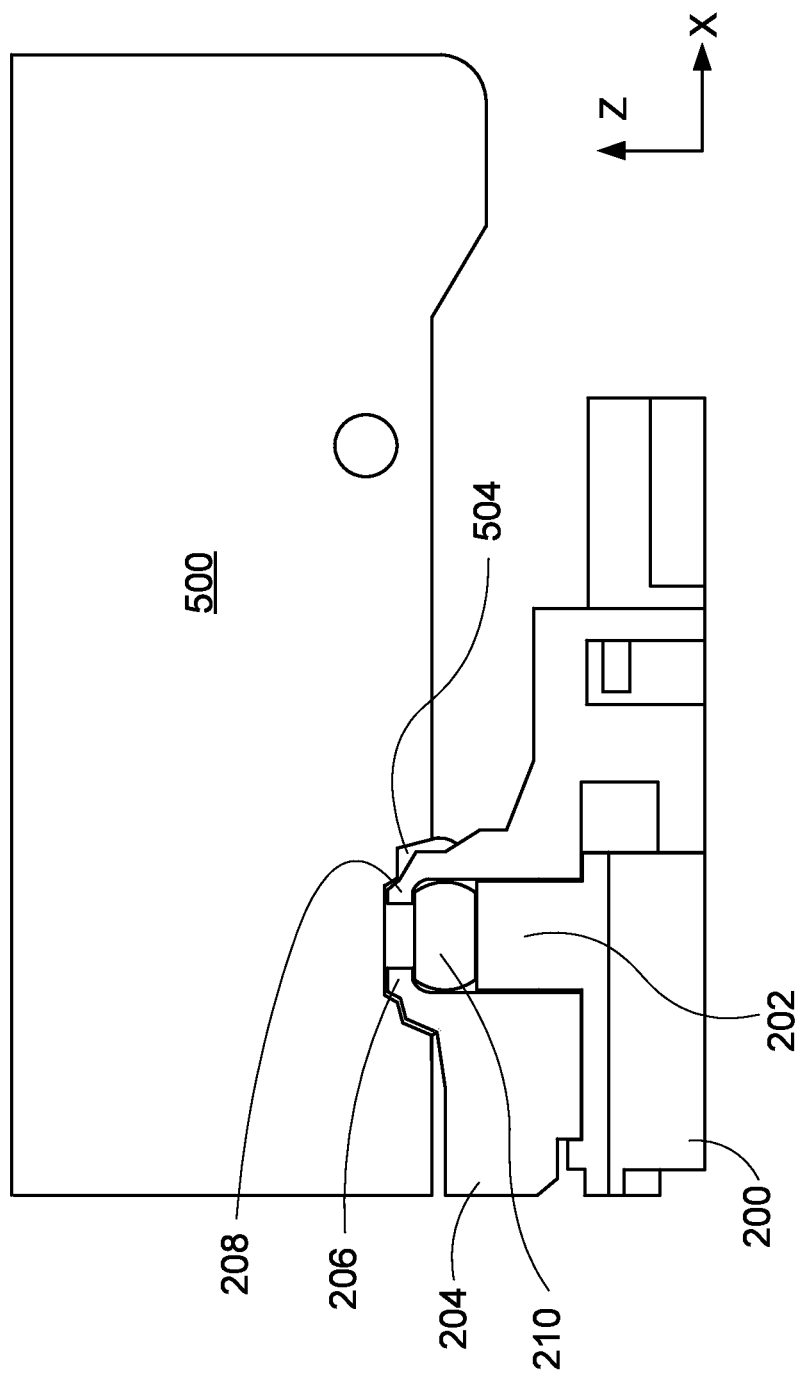
FIG. 5B illustrates the circuit breaker shown in FIG. 5A plugged onto the neutral rail in an installed position.

In FIG. 5B, the circuit breaker 500 is shown with the neutral connector 504 (partially obscured in FIG. 5B but shown in FIG. 5A) plugged onto the neutral rail 210, which is itself retained by the retention features 206, 208 between the shield member 204 and the base 200 by the protrusion 202. The protrusion 202 is configured and is operable to create the retaining area 300 as the neutral rail 210 is installed in a Z-axis direction through the gap 502 between the retention features 206, 208, and then to force the rail 210 after it is rotated 90 degrees into secure engagement against the retention features 206, 208.

Each of the retention features 206, 208 can be supported on the shield member 204 by a pair of supports 220, 222, such as shown in FIGS. 2A and 5A. The support 220 can resemble a flying buttress, and the supports 220, 222 provide Z-axis rigidity to the retaining features 206, 208 to prevent them from flexing apart, thereby undesirably widening the gap 502, over time or during continuous mounting and dismounting of plug-on circuit breakers 500 relative to the neutral rail 210.

To retain the shield member 204 relative to the base 200 in a fixed arrangement, one or more snap fit clips 510 (shown in FIG. 5A), which can resemble hooks, protrude along the Z-axis from the base 200 and snap fit in place when the shield member 204 is installed along the Z-axis onto the base 200. As can be seen in FIG. 2A, numerous such snap fit clips 510 can be disposed along the base 200 to securely retain the shield member 204 relative to the base 200 when fully installed. As noted below, it is advantageous that the entire load center 106 can be assembled along the Z-axis, first providing the base 200, then placing the shield 204 over the base 200, then dropping in the rail 210 along its skinny (narrow) dimension, causing the rail 210 to rotate 90 degrees along its wide dimension, and then snapping the shield 204 into the base 200 by operation of the snap fit clips 510 of the base 200 engaging the shield 204.

As mentioned above, the neutral rail 210 is connected both mechanically and electrically to a neutral busbar 802 (shown in FIGS. 8A-8B) of the load center 106. To make this connection, a neutral connector 700, such as the one shown in FIG. 7, can be used. Those skilled in the art of electrical distribution systems will appreciate the myriad of ways to connect the neutral rail 210 to the neutral busbar 802, so the example shown in FIGS. 7, 8A-8B is but one of many that can be used. The neutral busbar 802 conventionally connects the load center 106 to a neutral electrical current returned to a power source external to the enclosure 102.

The neutral connector 700 includes a rail retention feature 702 that is configured to retain the neutral rail 210 in the rail retention feature 702. The neutral connector 700 also includes a connector feature 704 that is configured to connect to the neutral busbar 802. Note that FIGS. 8A and 8B show two neutral busbars 802a, 802b, one for each side of the load center 106, as well as two corresponding neutral rails 210a, 210b, which are also shown in FIG. 2A. The same neutral connector 700 can be used on either side of the load center 106. The rail retention feature 702 is enclosed and has an opening through which an end of the neutral rail 210 is received (see FIGS. 8A, 8B). The connector feature 704 includes a tab having an aperture 708 configured to receive a fastener 804a, b that fastens the tab 704 of the neutral connector 700 to the neutral busbar 802. A fastener 706, such as a screw, fastens the end of the neutral rail 210 that is inserted lengthwise through the opening of the rail retention feature 702 of the neutral connector 700, and mechanically secures the neutral rail 210 in the rail retention feature 702 as well as electrically couples the neutral rail 210 to the neutral busbar 802 via the neutral connector 700.

As mentioned above, an advantageous aspect of the present disclosure is how the load center 106 is assembled. Assembling the various components of the load center 106 along the Z-axis results in a faster assembly time, fewer steps, and can be done manually or automatically readily with relatively little sophistication. FIGS. 4A-4D illustrate a sequence of four steps to install the neutral rail 210 into the load center 106. These are shown in perspective views in FIGS. 6A-6C.

A fixed dielectric base 200 is provided, like the base 200 shown and described above. The base 200 has a major surface lying along the X-Y plane and a protrusion 204 extending away from the X-Y plane along a Z-axis orthogonal to the X-Y plane. In FIGS. 4A and 6A, the base 200 is already provided. The load center 106 can be assembled outside of the enclosure 102, for example. Next, the dielectric shield member 204 is placed over the base along the Z-axis such that a bottom surface of the shield member 204 rests a distance above (see distance d3 in FIG. 3C) a top surface of the base 200. For example, the shield member 204 can temporarily rest on the snap fit clips 510 over the base 200 while the rail 210 is installed.

As shown by the arrows in FIGS. 4A and 6A, the elongate plug-on neutral rail 210 is inserted lengthwise through the gap 502 in a direction along the Z-axis (FIG. 5A). As noted above, the oblong cross-section (e.g., rounded rectangular having a narrow dimension and a wide dimension) of the rail 210 causes the rail 210 to rotate automatically by 90 degrees. Alternately, the rail 210 can be manually rotated until it rests on top of the protrusion 204 along its wide edge. These rotations are shown by the arrows in FIGS. 4B and 6B and can also be seen in FIG. 3B. Note that the rotations can occur either clockwise or anti-clockwise, so either rotational direction is contemplated though only an exemplary one is shown. The final resting position of the conductor is shown in FIG. 4C (also FIG. 3C), before the shield member 204 is secured to the base 200. Once the rail 210 is rotated so that its surface corresponding to the wide dimension rests on the protrusion 202 (as shown in FIGS. 3C and 4C), a force along the Z-axis (see the arrows in FIG. 4D) is applied to decrease the distance d3 between the bottom surface of the shield member 204 and the top surface of the base 200 until the surface of rail 210 along its wide dimension rests on the protrusion 202 as shown in FIGS. 4D and 6C. Of course, as shown in FIGS. 6A-6C, when there are two conductors 210a, 210b in the load center 106, the force operates to snap the shield member 204 to the base 200 and securely retain therebetween the two conductors 210a, 210b.

As noted above, the rounded rectangular shape of the neutral rail 210 lends itself to automatically rotating the neutral rail 210 once it is dropped between the gap 502. A ramp feature (not shown) can formed in the shield member 204 at the bottom of the retaining area 300 to begin tipping the neutral rail 210 clockwise or anti-clockwise until the protrusion 202 is fully seated within the retaining area 300 as the shield member 204 and the base 200 are brought together. This ramp feature would accommodate neutral rails of any form factors that are not inclined to automatically rotate. For example, rectangular-shaped neutral rails would not rotate when dropped into the retaining area 300 through the gap 502, but instead would rest on the protrusion 202 along the skinny dimension. To assist in beginning to rotate such a neutral rail, a ramp feature can be formed in the shield member 204 as described above to tip the neutral rail off of its skinny dimension until it is fully seated into position by the upward movement of the protrusion 202 into the retaining area 300.

FIGS. 9, 10, and 11A-5B also feature different variations of a "snap-in" or plug-on neutral rail. By "snap-in," it is meant that the neutral rail 210 snaps into one or more retaining features to secure the neutral rail 210 into the load center 106, preferably without any fasteners, though the use of fasteners is not precluded.

Figure 9:
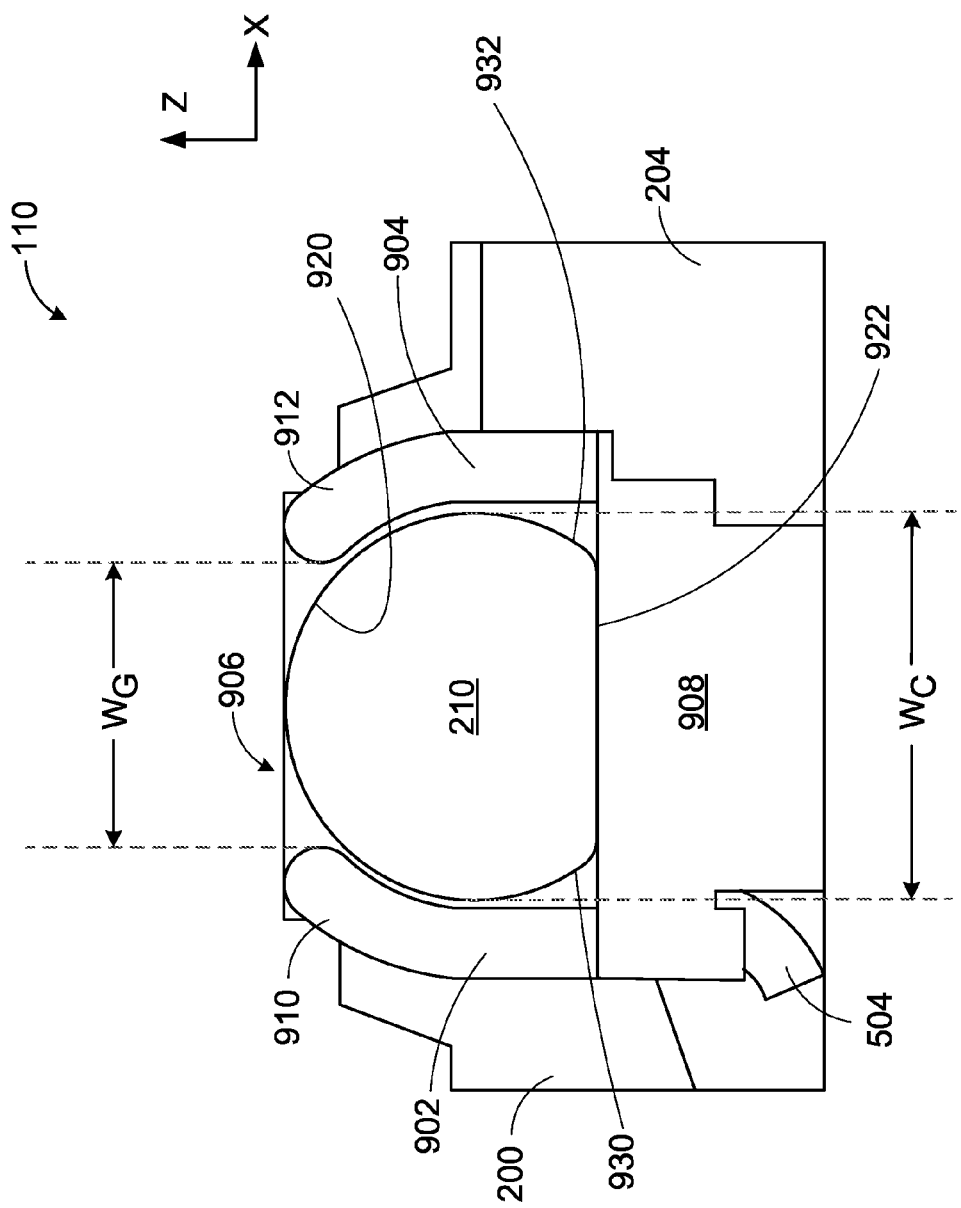
FIG. 9 is a cross-sectional view of a neutral rail snapped into a shield member by retaining fingers according to an aspect of the present disclosure.

Turning to FIG. 9, the plug-on section 110 includes a dielectric shield member 204 and a first retention feature 902 and a second retention feature 904 that extends away from the X-Y plane along the Z-axis. An air gap 906 is defined by the first and second retention features 902, 904. A support member 908 sits below (along the Z-axis) the gap 906. The neutral rail 210 has an overall width dimension $W_C$ that is larger than a width $W_G$ of the gap 906 such that $W_C > W_G$. The "fattest" part of the neutral rail 210 is received through the gap 906 in a direction along the Z-axis and is retained by the retention features 902, 904 against the support 908. Each of the retention features 902, 904 includes curved upper portions 910, 912 that are bent toward one another to create the gap 906 that spans the width $W_G$.

The neutral rail 210 shown in FIG. 3 has a cross section that has a generally round portion 920 along a length (Y-axis) of the neutral rail 210 and a flattened bottom portion 922 that abuts against the support member 908 when the neutral rail 210 is retained in the load center 106 by the retention features 902, 904. The cross section of the neutral rail 210 includes rounded bottom edges 930, 932 on either side of the flattened bottom portion 922 such that the rounded bottom edges 930, 932 engage the retention features 902, 904 as the neutral rail 210 is inserted in a direction along the Z-axis through the gap 906. In the example illustrated in FIG. 3, the retention features 902, 904 are integrally formed with the dielectric shield member 204, though the retention features 902, 904 in other aspects are not integrally formed with the dielectric shield member 204.

Each of the retention features 902, 904 has a sufficient flexibility and stiffness to allow the retention features 902, 904 to flex from an unstressed position (shown in FIG. 9) and thereby widen the gap 906 enough to allow the neutral rail 210 to be inserted through the gap 906 and to return to the unstressed position after the neutral rail 210 has cleared the gap 906 and is installed on the flat upper surface of the support member 908. Those of skill in the art familiar with snap fit engagements will appreciate that the terms "sufficient flexibility and stiffness" depend on the relative dimensions of the width $W_G$ of the gap 906 and the width $W_C$ of the neutral rail 210, to cause the retention features 902, 904 to have enough flexibility to separate as the bottom rounded edges 930, 932 of the neutral rail 210 are forced downward along the Z-axis through the retention features 902, 904, and also enough stiffness to return to their original unstressed position before they were separated.

Figure 10:
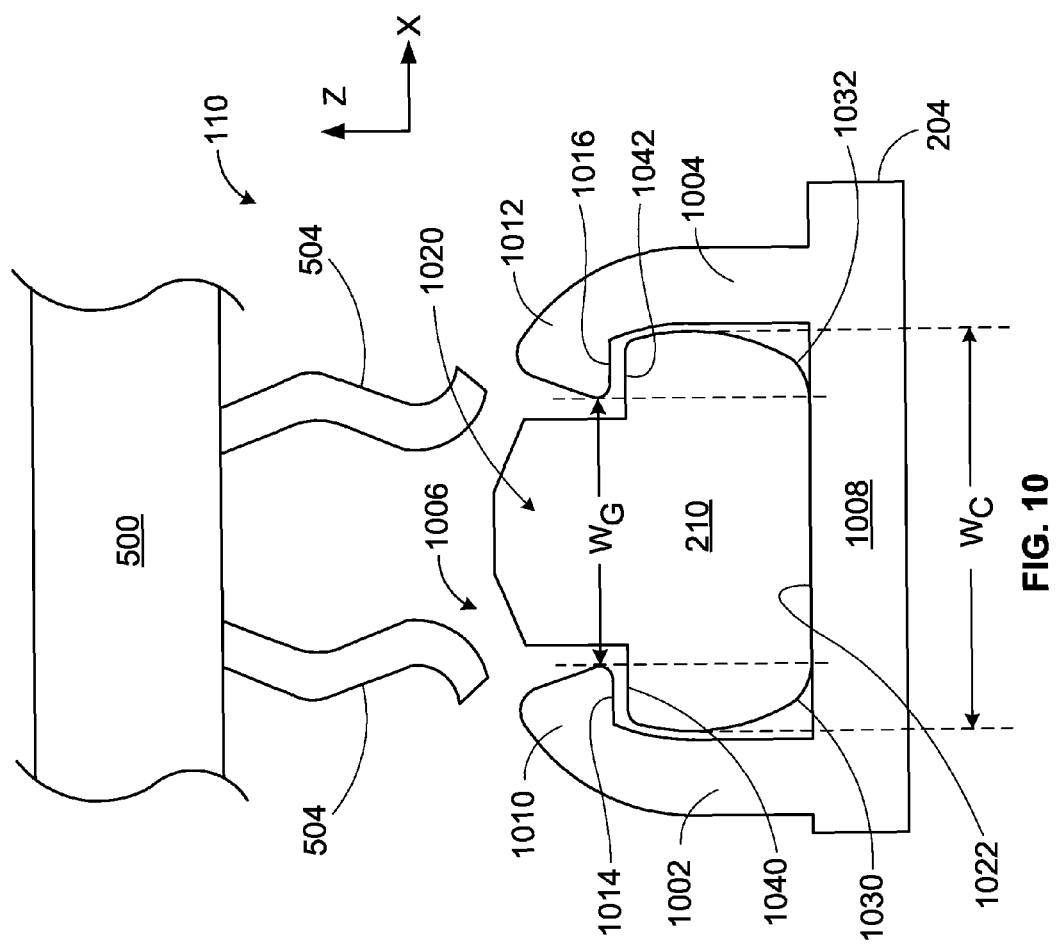
FIG. 10 is a cross-sectional view of a neutral rail snapped into a shield member by retaining hooks according to another aspect of the present disclosure.

FIG. 10 illustrates a neutral rail 210 in a snap-fit engagement with the dielectric shield member 204 in the plug-on section 110 of the load center 106, such as the one shown in FIG. 1. The plug-on section 110 shown in FIG. 10 includes a first retention feature 1002 and a second retention feature 1004, both of which extend away from the X-Y plane along the Z-axis. The base 200 is not shown in this figure, and can be optionally omitted. An air gap 1006 is defined by and extends between the first and second retention features 1002, 1004. A support member 1008 sits below (along the Z-axis) the gap 1006. The neutral rail 210 has an overall width dimension $W_C$ that is larger than a width $W_G$ of the gap 1006 such that $W_C > W_G$. The "fattest" part of the neutral rail 210 is received through the gap 1006 in a direction along the Z-axis and is retained by the retention features 1002, 1004 against the support 1008.

Each of the retention features 1002, 1004 includes curved upper portions 1010, 1012 that are bent toward one another to create the gap 1006 that spans the width $W_G$. The retention features are snap fingers such that each of the curved upper portions 1010, 1012 forms a corresponding snap fit clip portion 1014, 1016 that engages corresponding side flat surfaces 1040, 1042 of the neutral rail 210.

The neutral rail 210 has a bottom flat surface 1022 that rests against the support 1008 and a top portion 1020 that extends along the Z-axis away from the corresponding side flat surfaces 1040, 1042. The top portion 1020 is configured to receive thereon the plug-on neutral connector 504 of the circuit breaker 500. The side flat surfaces 1040, 1042 contribute to the width dimension $W_C$ of the neutral rail 210. The cross section of the neutral rail 210 includes rounded bottom edges 1030, 1032 on either side of the flattened bottom portion 1022 such that the rounded bottom edges 1030, 1032 engage the retention features 1002, 1004 as the neutral rail 210 is inserted in a direction along the Z-axis through the gap 1006 toward the rear wall 104. In the example illustrated in FIG. 10, the retention features 1002, 1004 are integrally formed with the dielectric shield member 204, though the retention features 1002, 1004 in other aspects are not integrally formed with the dielectric shield member 204.

Like the retention features 902, 904 shown in FIG. 9, the retention features 1002, 1004 shown in FIG. 10 have sufficient flexibility and stiffness to allow them to flex from an unstressed position (shown in FIG. 10) and thereby widen the gap 1006 enough to allow the neutral rail 210 to be inserted through the gap 1006 and to return to the unstressed position after the neutral rail 210 has cleared the gap 1006 and is installed on the flat upper surface of the support member 1008.

FIGS. 11A-11B illustrate a neutral rail 210 being retained within the plug-on section 110 of the load center 106 through cooperating surfaces of the base 200 and the dielectric shield 204. The base 200 shown in FIG. 5 includes a first retention feature 1102 that extends away from the X-Y plane along the Z-axis. The shield member 204 includes a second retention feature 1104 that also extends away from the X-Y plane along the Z-axis. An air gap 1106 is defined by and extends between the first and second retention features 1102, 1104. A support 1108 sits below (along the Z-axis) the gap 1106 and is part of the shield member 204. The neutral rail 210 has an overall width dimension $W_C$ that is larger than a width $W_G$ of the gap 1106 such that $W_C > W_G$. The "fattest" part of the neutral rail 210 is received through the gap 1106 in a direction along the Z-axis and is first retained by the retention feature 1102 of the base 200 and the support 1108 of the shield member 204, and is then retained by the second retention feature 1104 of the shield member 204. Each of the retention features 1102, 1104 includes curved surfaces 1110, 1112 that are bent toward one another to create the gap 1106 that spans the width $W_G$. These surfaces 1110, 1112 mate with corresponding the curved surface 1120 of the neutral rail 210. In the illustrated example shown in FIG. 11, the neutral rail 210 is a round bar with a round cross section along the entire length (along the Y-axis) of the neutral rail 210. The neutral rail 210 has an exposed surface portion 1120 that is configured to receive thereon a plug-on neutral connector 504 of a circuit breaker 500 (shown in FIG. 11A). The base 200 and the shield member 204 can be snap fit together by respective snap fit features 1150, 1152.

Words of degree, such as "about," "substantially," and the like are used herein in the sense of "at, or nearly at, when given the manufacturing, design, and material tolerances inherent in the stated circumstances" and are used to prevent the unscrupulous infringer from unfairly taking advantage of the invention disclosure where exact or absolute figures and operational or structural relationships are stated as an aid to understanding the inventive aspects disclosed herein.

While particular embodiments and applications of the present invention have been illustrated and described, it is to be understood that the invention is not limited to the precise construction and compositions disclosed herein and that various modifications, changes, and variations can be apparent from the foregoing descriptions without departing from the spirit and scope of the invention as defined in the appended claims.

What is claimed is:

1. An electrical distribution apparatus, comprising:
   a fixed dielectric base having a major surface defining a plane and a protrusion extending away from the plane along a z-axis orthogonal to the plane;
   a separate dielectric shield member having opposing retention features positioned a distance from the plane along the z-axis and from the protrusion, the retention features forming a gap therebetween; and
   an elongate plug-on neutral rail having a cross section whose first dimension is smaller than a second dimension orthogonal to the first dimension,
   wherein a width of the gap is larger than the first dimension but smaller than the second dimension.

2. The apparatus of claim 1, wherein a distance between the protrusion and the retention features is smaller than the second dimension when the base is installed relative to the shield member.

3. The apparatus of claim 1, wherein the plug-on neutral rail is configured to be inserted through the gap along the first dimension but is retained by the retention features of the shield member against the protrusion along the second dimension.

4. The apparatus of claim 1, further comprising an enclosure into which the base, the shield member, and the neutral rail are installed.

5. The apparatus of claim 1, wherein the neutral rail is configured to receive a plug-on neutral connector of a circuit breaker, the plug-on neutral connector being configured to connect the circuit breaker to neutral current distributed by the apparatus.

6. The apparatus of claim 1, wherein the cross section of the neutral rail is generally oval or rounded rectangular and has the same cross section across an entire length of the neutral rail.

7. The apparatus of claim 1, wherein the cross section of the neutral rail is generally oblong.

8. The apparatus of claim 1, wherein the neutral rail includes aluminum or copper and is elongate, and wherein the apparatus is a loadcenter.

9. The apparatus of claim 1, further comprising a neutral connector mechanically and electrically connecting the neutral rail to a neutral busbar of the apparatus, the neutral busbar being configured to connect the apparatus to a neutral electrical current corresponding to a power source external to the apparatus.

10. The apparatus of claim 9, wherein the neutral connector includes a rail retention feature configured to retain the neutral rail in the rail retention feature, and a connector feature configured to connect to the neutral busbar.

11. The apparatus of claim 10, wherein the rail retention feature of the neutral connector is enclosed and has an opening through which an end of the neutral rail is received, and the connector feature includes a tab having an aperture configured to receive a fastener that fastens the tab of the neutral connector to the neutral busbar.

12. The apparatus of claim 1, wherein each of the opposing retention features includes a finger member having a corresponding inner surface whose shape conforms to an edge portion of the neutral rail when installed against the protrusion to retain the neutral rail securely between the shield member and the base.

13. The apparatus of claim 1, wherein the opposing retention features is a plurality of opposing retention features that are disposed along a length of the shield member at a spacing corresponding to at least a width of a circuit breaker installed onto the neutral rail, and wherein the protrusion extends along substantially the entirety of the length of the shield member.

14. An electrical distribution apparatus, comprising:
    a rear wall defining a plane;
    a dielectric substrate having a major surface parallel with the plane;
    a dielectric shield member;
    a retention feature extending away from the plane along a z-axis;
    a gap defined by at least the retention feature on one side;
    a support member below the gap along the z-axis; and
    a plug-on neutral rail, a part of which has a width dimension that is larger than a width of the gap, wherein the part of the plug-on neutral rail is received through the gap in a direction along the z-axis and is retained at least by the retention feature against the support.

15. The apparatus of claim 14, wherein the retention feature is a pair of retention features defining the gap, the retention features having a curved upper portion that cause the retention features to bend toward one another.

16. The apparatus of claim 15, wherein the neutral rail has a cross section that has a generally round portion along a length of the neutral rail and a flattened bottom portion that abuts against the support member when the neutral rail is retained by the retention features.

17. The apparatus of claim 15, wherein the cross section includes rounded bottom edges on either side of the flattened bottom portion such that the rounded bottom edges engage the retention features as the neutral rail is inserted in a direction along the z-axis through the gap.

18. The apparatus of claim 14, wherein the retention feature is integrally formed with the dielectric shield member.

19. The apparatus of claim 15, wherein the retention features are snap fingers such that each of the curved upper portions forms a snap fit clip portion that engages corresponding side flat surfaces of the neutral rail, the neutral rail having a bottom flat surface that rests against the support and a top portion extending along the z-axis away from the corresponding side flat surfaces, the top portion being configured to receive thereon a plug-on neutral connector of a circuit breaker.

20. The apparatus of claim 19, wherein the side flat surfaces contribute to the width dimension of the neutral rail.

21. The apparatus of claim 14, wherein the retention feature has a sufficient flexibility and stiffness to allow the retention feature to flex from an unstressed position and thereby widen the gap enough to allow the neutral rail to be inserted through the gap and to return to the unstressed position in response to the neutral rail clearing the gap.

22. The apparatus of claim 14, wherein the dielectric shield member includes the retention feature, wherein the dielectric substrate has a second retention feature, and wherein the retention feature and the second retention feature form the gap.

23. The apparatus of claim 21, wherein the retention feature includes a curved surface configured to mate with a first curved surface portion of the neutral rail, and wherein the second retention feature includes a curved surface configured to mate with a second curved surface portion of the neutral rail.

24. The apparatus of claim 23, wherein the neutral rail is a round bar with a round cross section along the entire length of the neutral rail, the neutral rail having an exposed surface portion configured to receive thereon a plug-on neutral connector of a circuit breaker.

* * * * *